(12) United States Patent
Chiou (10) Patent No.: US 12,360,446 B2
(45) Date of Patent: Jul. 15, 2025

(54) COLOR GAMUT CONVERSION MODULE, CONVERSION METHOD THEREOF, AND PROJECTION DEVICE

(71) Applicant: Coretronic Corporation, Hsin-Chu (TW)

(72) Inventor: Shih-Chen Chiou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 368 days.

(21) Appl. No.: 17/900,889

(22) Filed: Sep. 1, 2022

(65) Prior Publication Data

US 2023/0069926 A1 Mar. 9, 2023

(30) Foreign Application Priority Data

Sep. 6, 2021 (CN) .......................... 202111046891.0

(51) Int. Cl.
  *G03B 21/20* (2006.01)
  *G02B 26/00* (2006.01)
  *G03B 33/08* (2006.01)

(52) U.S. Cl.
  CPC ......... *G03B 21/204* (2013.01); *G02B 26/008* (2013.01); *G03B 33/08* (2013.01)

(58) Field of Classification Search
  None
  See application file for complete search history.

(56) References Cited

U.S. PATENT DOCUMENTS

| | | | |
|---|---|---|---|
| 2018/0149957 A1* | 5/2018 | Maeda | H04N 9/3102 |
| 2021/0263400 A1* | 8/2021 | Chien | G02B 26/008 |

FOREIGN PATENT DOCUMENTS

| | | |
|---|---|---|
| CN | 103792635 | 2/2016 |
| CN | 111458966 A * | 7/2020 |

* cited by examiner

*Primary Examiner* — Toan Ton
*Assistant Examiner* — Danell L Owens
(74) *Attorney, Agent, or Firm* — JCIPRNET (57) ABSTRACT

A color gamut conversion module, a conversion method thereof, and a projection device are provided. The color gamut conversion module includes a wavelength conversion element and a light filtering element. The wavelength conversion element includes at least two wavelength conversion regions, and the light filtering element includes at least one filtering region. Each filtering region is a single-band light filtering region or a multi-band light filtering region. In a visible light transmittance spectrum, the single-band light filtering region includes a band-pass wave band, and the multi-band light filtering region includes a plurality of first band-pass wave bands and a plurality of first cut-off wave bands. In a first color gamut mode, the wavelength conversion element and the light filtering element rotate at a first relative rate. In a second color gamut mode, the wavelength conversion element and the light filtering element rotate at a second relative rate.

16 Claims, 8 Drawing Sheets

COLOR GAMUT CONVERSION MODULE, CONVERSION METHOD THEREOF, AND PROJECTION DEVICE

CROSS-REFERENCE TO RELATED APPLICATION

This application claims the priority benefit of China application serial no. 202111046891.0, filed on Sep. 6, 2021. The entirety of the above-mentioned patent application is hereby incorporated by reference herein and made a part of this specification.

BACKGROUND

Technical Field

The disclosure relates to an optical module, an optical processing method, and an optical device, and in particular to a color gamut conversion module, a conversion method thereof, and a projection device.

Description of Related Art

With the development of projection devices (projectors), projection devices that emit excitation light by using a laser light source and light-emitting diodes (LED) to excite wavelength conversion materials (such as phosphors) have been widely used. Take a single light valve configuration as an example, an excitation light source is focused on a wavelength conversion element (such as a phosphor wheel) that rotates at a high speed, and after being excited or reflected by the wavelength conversion element, an illumination light beam is focused by a lens, and then penetrates a light filtering element (such as a filtering color wheel) that rotates at a high speed synchronously, thereby achieving an effect of sequential light splitting.

Generally, the color gamut distribution of a projection device depends on the combination of the wavelength conversion element and the light filtering element. Therefore, to achieve the effect of multiple color gamuts on the projection device of a single machine, other light filtering elements are required to be disposed to achieve the effect of multiple color gamuts.

However, adding other light filtering elements to the projection device is more complicated in assembly, requires higher costs in manufacturing, and causes space and noise issues. For example, multiple light filtering elements that are required occupy a larger space in the projection device. Moreover, the light filtering elements produce greater noise due to the high-speed rotation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a color gamut conversion module, a conversion method thereof, and a projection device with a color gamut conversion module, which achieve color gamut switching with a simple configuration. Therefore, the manufacturing cost of the color gamut conversion module is low, the space occupied by the color gamut conversion module is small, and the color gamut conversion module is less likely to generate excessive noise under high-speed rotation.

Other objectives and advantages of the disclosure may be further understood from the technical features disclosed in the disclosure.

In order to achieve one or part or all of the above-mentioned objectives or other objectives, the disclosure provides a color gamut conversion module that includes a wavelength conversion element and a light filtering element. The wavelength conversion element includes at least two wavelength conversion regions. The light filtering element is disposed on a transmission path of an illumination light beam from the wavelength conversion element. The light filtering element includes at least one filtering region, and each filtering region is a single-band light filtering region or a multi-band light filtering region. In a visible light transmittance spectrum, the single-band light filtering region includes a band-pass wave band, and the multi-band light filtering region includes a plurality of first band-pass wave bands and a plurality of first cut-off wave bands. Each of the first band-pass wave bands is located between two adjacent first cut-off wave bands, and at least one of these first band-pass wave bands at least partially overlaps the band-pass wave band. In a first color gamut mode, the wavelength conversion element and the light filtering element rotate at a first relative rate. In a second color gamut mode, the wavelength conversion element and the light filtering element rotate at a second relative rate.

The disclosure proposes a conversion method of a color gamut conversion module, including the follows. A color gamut conversion module is provided. The color gamut conversion module includes a wavelength conversion element and a light filtering element. The light filtering element includes at least one filtering region. Each filtering region is a single-band light filtering region or a multi-band light filtering region. In a visible light transmittance spectrum, the single-band light filtering region includes a band-pass wave band, and multi-band light filtering region includes a plurality of first band-pass wave bands and a plurality of first cut-off wave bands. Each of these first band-pass wave bands is located between two adjacent first cut-off wave bands. At least one of these first band-pass wave bands at least partially overlaps the band-pass wave band. The processor selects to convert to a first color gamut mode or a second color gamut mode. In the first color gamut mode, the wavelength conversion element and the light filtering element rotate at a first relative rate, and in the second color gamut mode, the wavelength conversion element and the light filtering element rotate at a second relative rate.

The disclosure proposes a projection device that includes an illumination module, a light valve, and a projection lens. The illumination module includes a light source and a color gamut conversion module. The light source is used to provide an excitation light beam. The color gamut conversion module is disposed on a transmission path of the excitation beam, and the color gamut conversion module includes a wavelength conversion element and a light filtering element. The wavelength conversion element includes at least two wavelength conversion regions. The light filtering element is disposed on a transmission path of an illumination light beam from the wavelength conversion element. The light filtering element includes at least one filtering region, and each filtering region is a single-band light filtering region or a multi-band light filtering region. In a visible light transmittance spectrum, the single-band light filtering region includes a band-pass wave band, and the multi-band light filtering region includes a plurality of first band-pass wave bands and a plurality of first cut-off wave bands. Each of these first band-pass wave bands is located between two adjacent first cut-off wave bands, and at least one of these first band-pass wave bands at least partially overlaps the band-pass wave band. In a first color gamut mode, the wavelength conversion element and the light filtering element rotate at a first relative rate. In a second color gamut mode, the wavelength conversion element and the light filtering element rotate at a second relative rate. The light valve is disposed on a transmission path of a combined beam from the light filtering element to convert the combined beam into an image beam. The projection lens is disposed on a transmission path of the image beam to project the image beam to the outside of the projection device.

In the color gamut conversion module, the conversion method thereof, and the projection device of the embodiment of the disclosure, the light filtering element uses a multi-band light filtering region to filter the illumination light beam from the wavelength conversion element to form another color gamut. Therefore, the color gamut conversion module, the conversion method thereof, and the projection device of the embodiment of the disclosure use a simple configuration and method to achieve color gamut switching, thereby effectively reducing the manufacturing cost and volume. In addition, the color gamut conversion module does not produce excessive noise.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIGS. being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
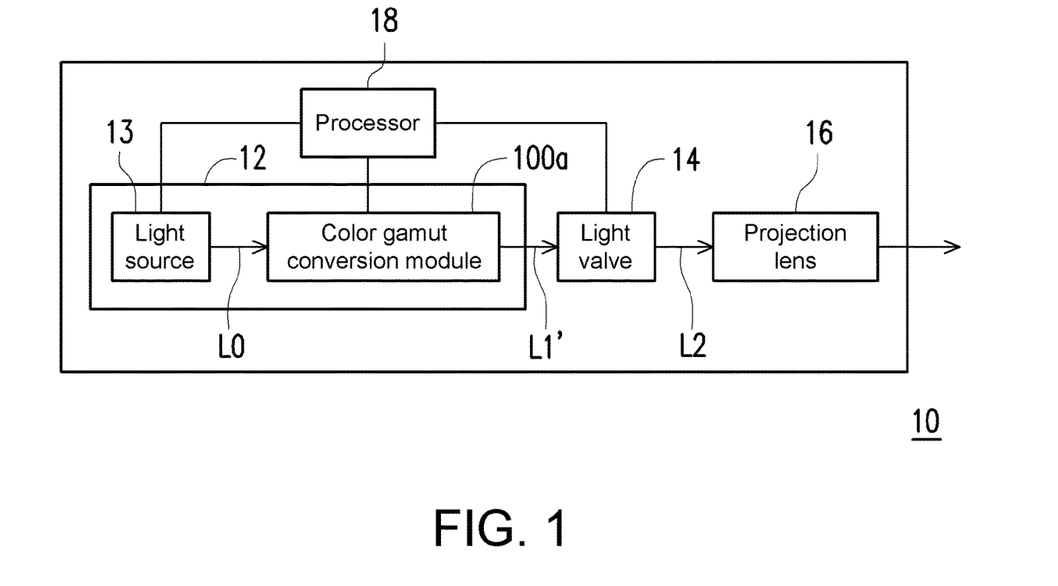
FIG. 1 is a schematic diagram of a configuration of a projection device according to an embodiment of the disclosure.
Figure 2A:
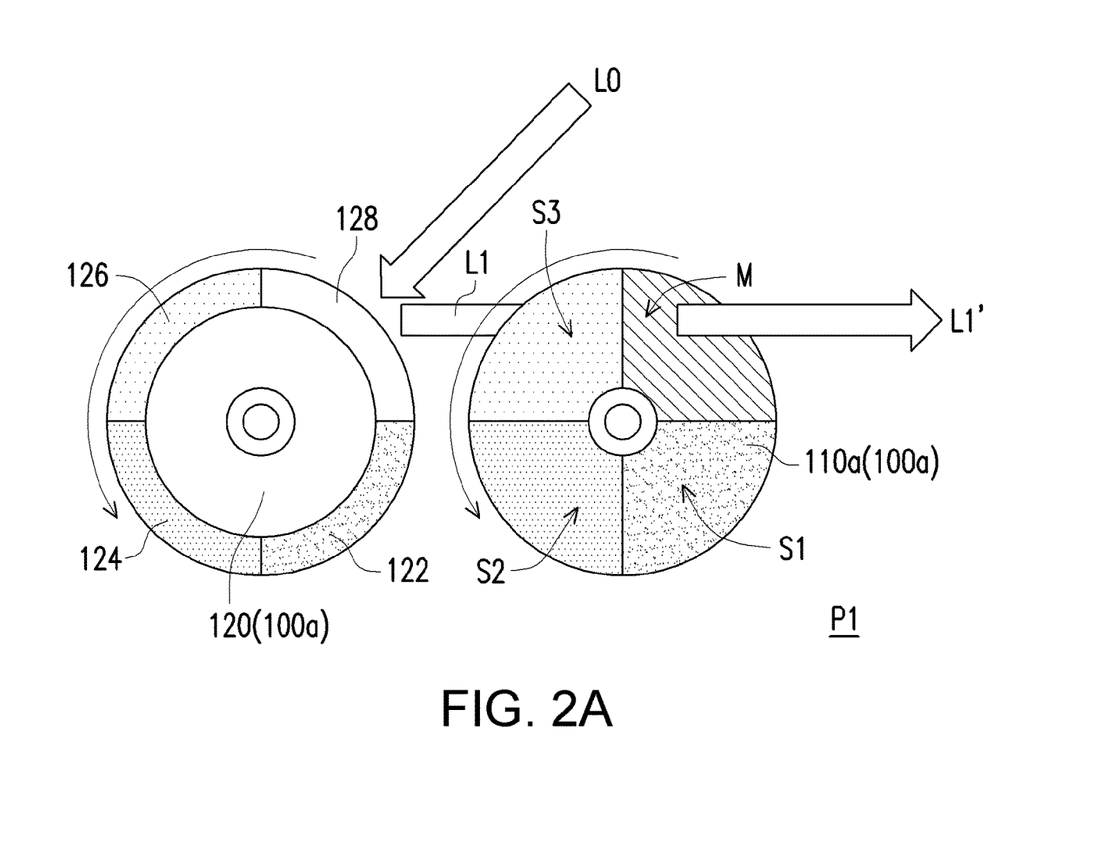
FIG. 2A is a schematic view of a light path of a color gamut conversion module in FIG. 1 in a first color gamut mode.

FIG. 1 is a schematic diagram of a configuration of a projection device according to an embodiment of the disclosure. FIG. 2A is a schematic view of a light path of a color gamut conversion module in FIG. 1 in a first color gamut mode. FIGS. 2B to 2E are schematic views of light paths of the color gamut conversion module in FIG. 1 in a second color gamut mode. Referring to FIG. 1 and FIGS. 2A to 2E, a projection device (projector) 10 of this embodiment includes an illumination module 12, a light valve 14, a projection lens 16, and a processor 18. The illumination module 12 includes a light source 13 and a color gamut conversion module 100a. The light source 13 is used to provide an excitation light beam L0, and the color gamut conversion module 100a is disposed on a transmission path of the excitation light beam L0. In this embodiment, the light source 13 is an excitation light source, which may include a laser diode (LD) and a light emitting diode (LED), and the excitation light beam L0 emitted by light source 13 is, for example, a blue excitation light beam. However, in other embodiments, the excitation light beam L0 may be an excitation light beam of other colors or an ultraviolet beam. The processor 18 is electrically connected to the light source 13, the color gamut conversion module 100a and the light valve 14, respectively.

Figure 2B:
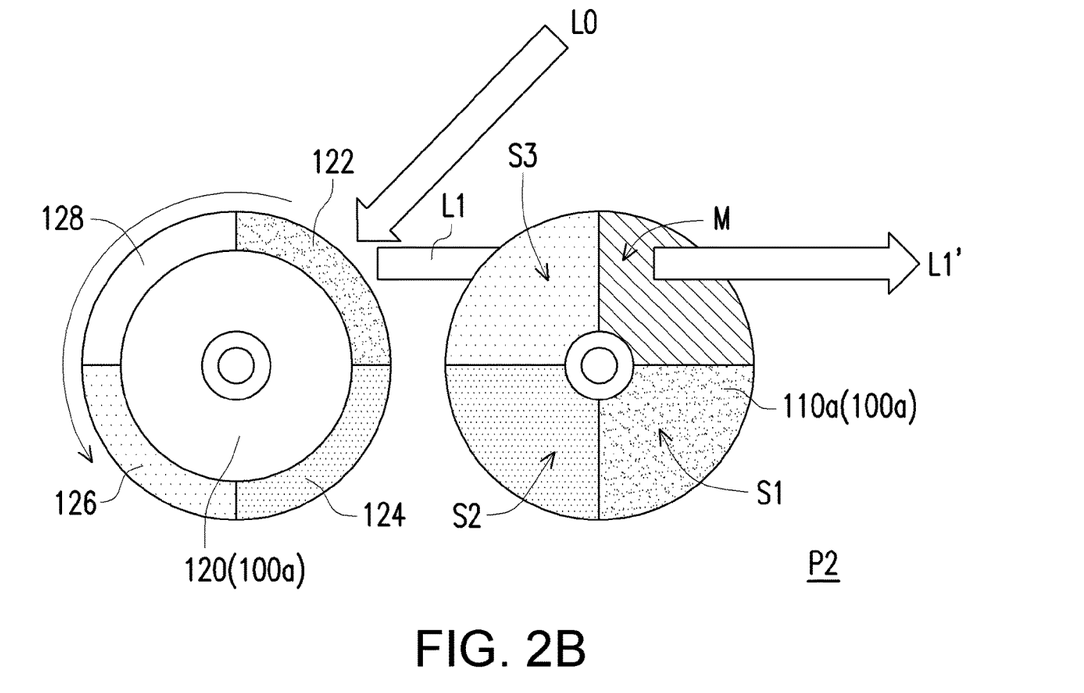
FIGS. 2B to 2E are schematic views of light paths of the color gamut conversion module in FIG. 1 in a second color gamut mode.
Figure 2C:
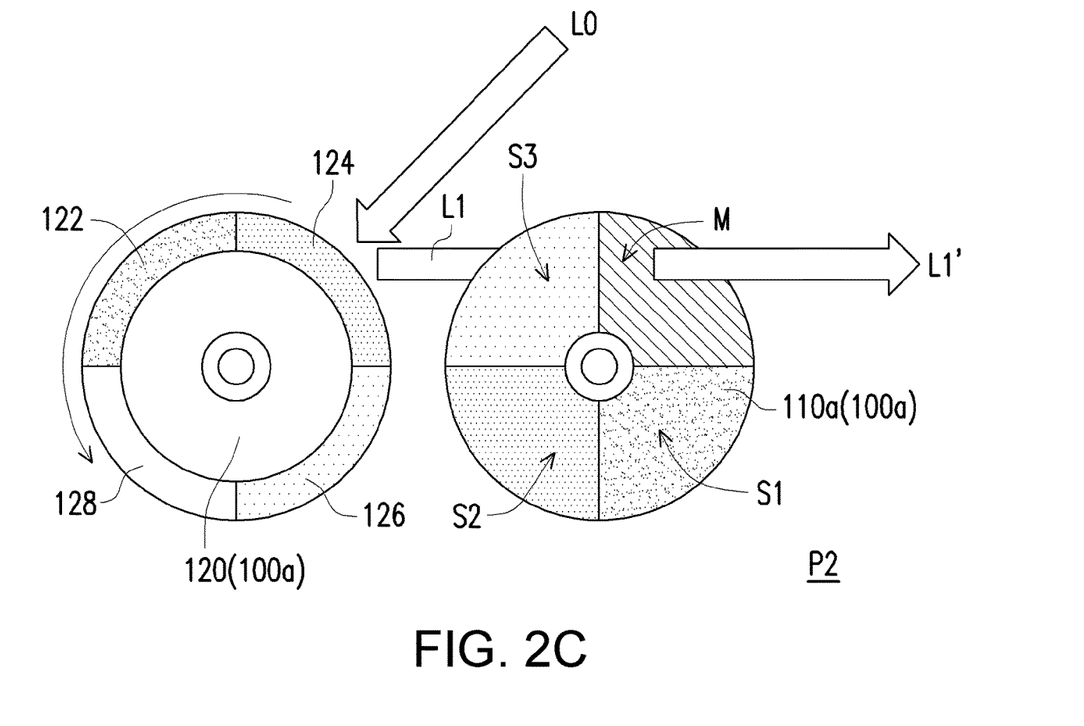
Figure 2D:
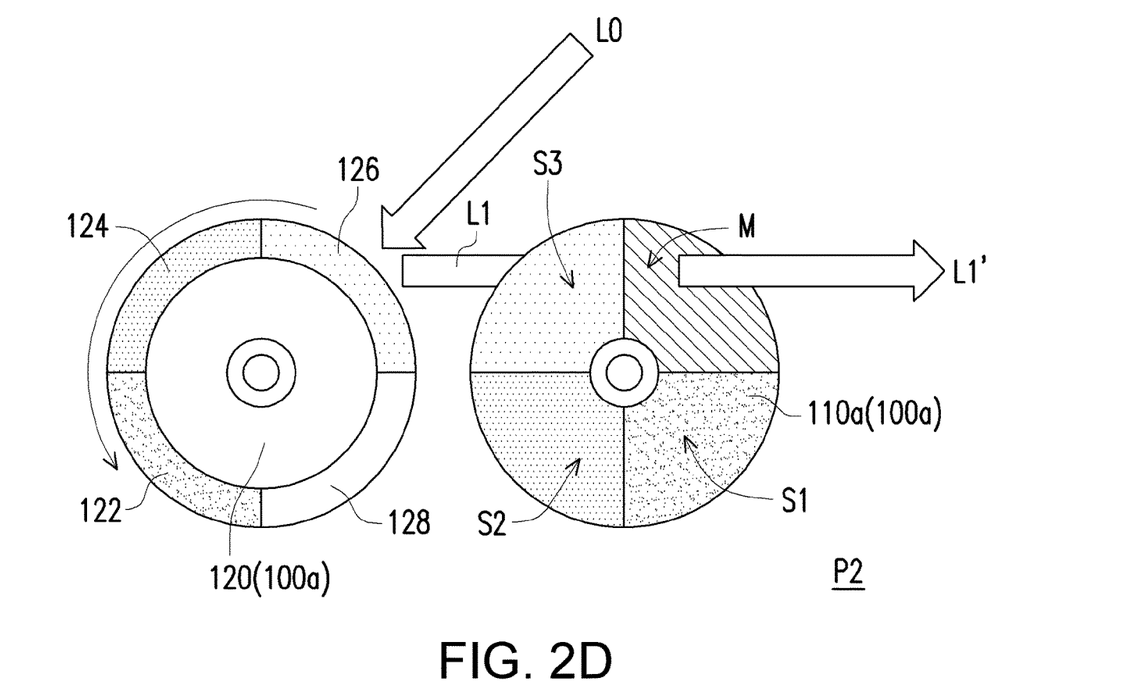
Figure 2E:
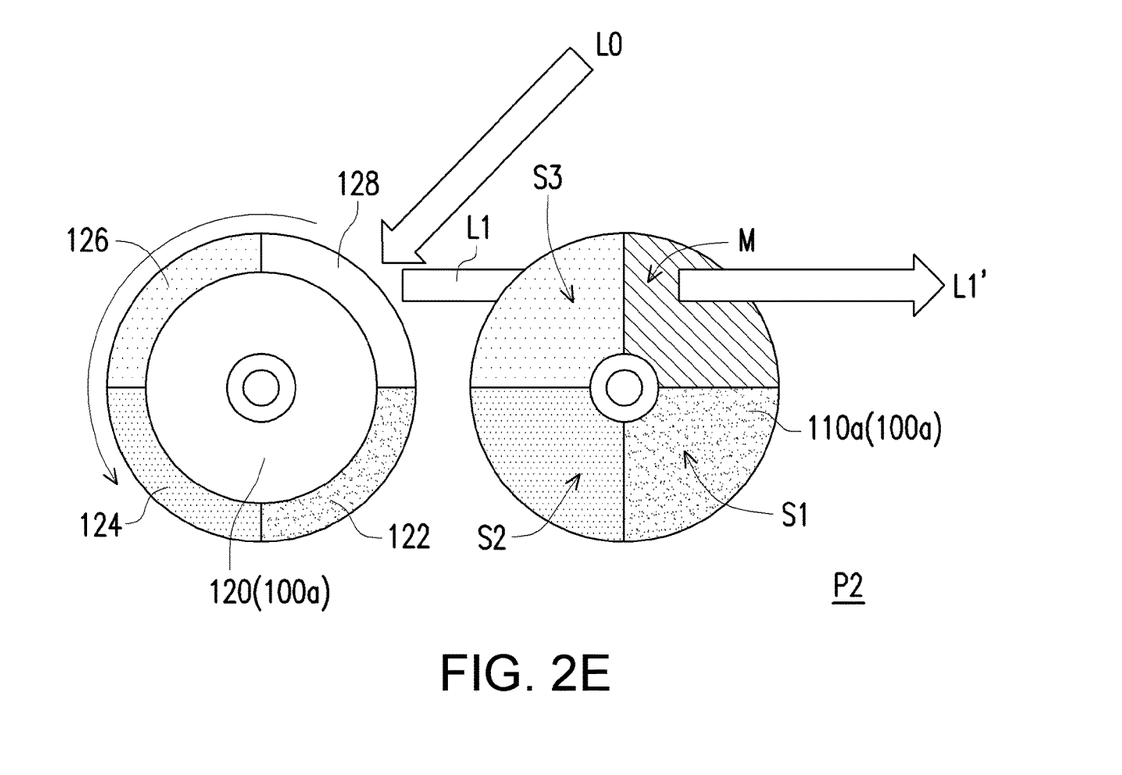

As shown in FIGS. 2A to 2E, the color gamut conversion module 100a includes a wavelength conversion element 120 and a light filtering element 110a. The wavelength conversion element 120 at least includes two wavelength conversion regions, and this embodiment uses three wavelength conversion regions 122, 124, and 126 and a non-wavelength conversion region 128 as an example. In this embodiment, the wavelength conversion region 122 is, for example, a red phosphor region; the wavelength conversion region 124 is, for example, a green phosphor region; the wavelength conversion region 126 is, for example, a yellow phosphor region; and the non-wavelength conversion region 128 is, for example, a reflection area or a transmission area, which may reflect the blue excitation light beam or be penetrated by the blue excitation light beam. In this embodiment, the reflection area is, for example, a reflector, while in another embodiment, the transmission area is, for example, any light-transmitting board or a hollow area. In another embodiment, when the excitation light beam L0 emitted by the light source 13 is ultraviolet light, the wavelength conversion element 120 includes a wavelength conversion region with blue phosphor to excite the ultraviolet light into a blue illumination light beam L1. In this embodiment, the wavelength conversion regions 122, 124, and 126 and the non-wavelength conversion region 128 of the wavelength conversion element 120 sequentially enter the transmission path of the blue excitation light beam L0 provided by the light source 13. As shown in FIG. 2B, when the blue excitation light beam L0 from the light source 13 irradiates the wavelength conversion region 122, the red phosphor is excited to produce the red illumination light beam L1. The red illumination light beam L1 is then passed to the light filtering element 110a. As shown in FIG. 2C, when the blue excitation light beam L0 from the light source 13 irradiates the wavelength conversion region 124, the green phosphor is excited to produce the green illumination light beam L1, and the green illumination light beam L1 is then passed to the light filtering element 110a. As shown in FIG. 2D, when the blue excitation light beam L0 from the light source 13 irradiates the wavelength conversion region 126, the yellow phosphor is excited to produce the yellow illumination light beam L1, and the yellow illumination light beam L1 is then passed to the light filtering element 110a. As shown in FIG. 2A, when the blue excitation light beam L0 from the light source 13 irradiates the non-wavelength conversion region 128, the excitation light beam L0 is reflected by the non-wavelength conversion region 128 (the reflection area), or the excitation light beam L0 penetrates the non-wavelength conversion region 128 (the transmission area), and the illumination light beam L1, which is still blue, is then passed to the light filtering element 110a.

Figure 3A:
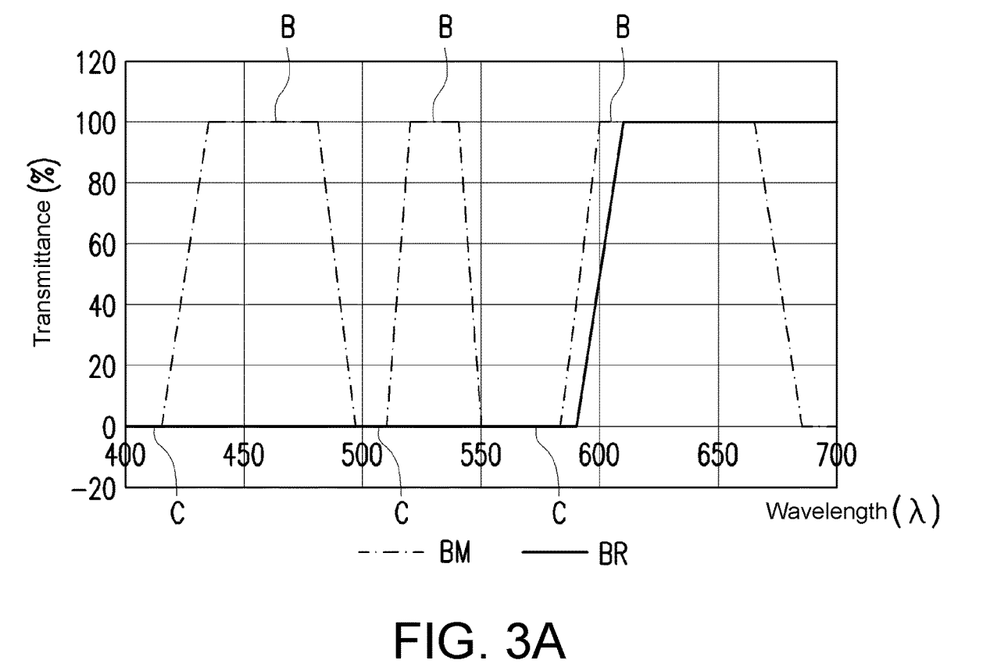
FIG. 3A is a comparison diagram of transmittance spectra of a single-band light filtering region S1 and a multi-band light filtering region M in FIG. 2A.
Figure 3B:
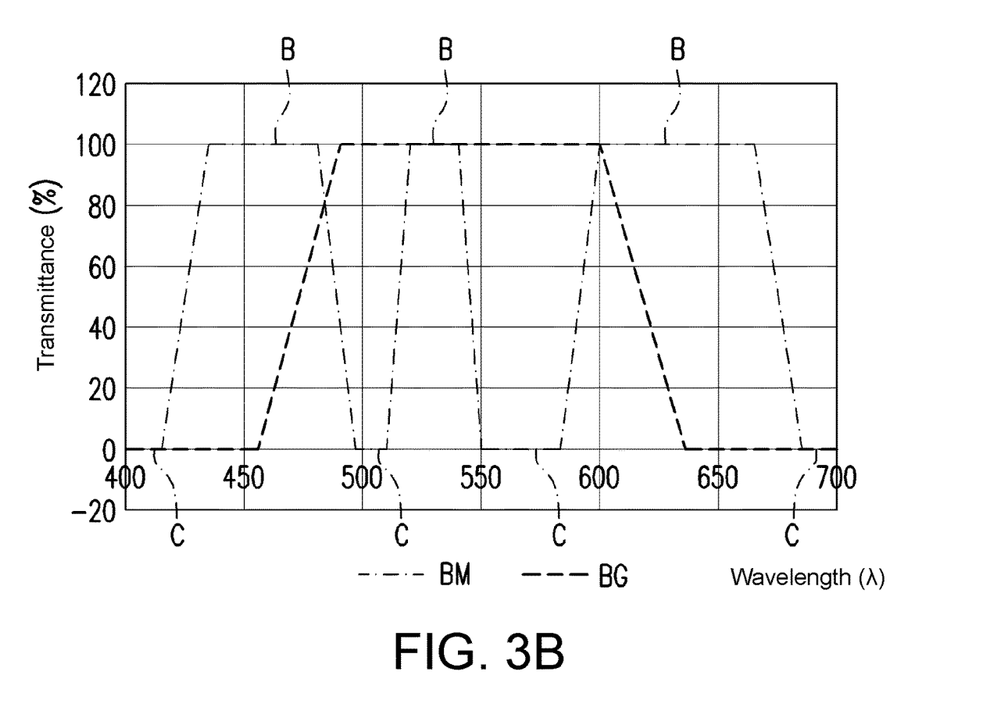
FIG. 3B is a comparison diagram of transmittance spectra of a single-band light filtering region S2 and the multi-band light filtering region M in FIG. 2A.
Figure 3C:
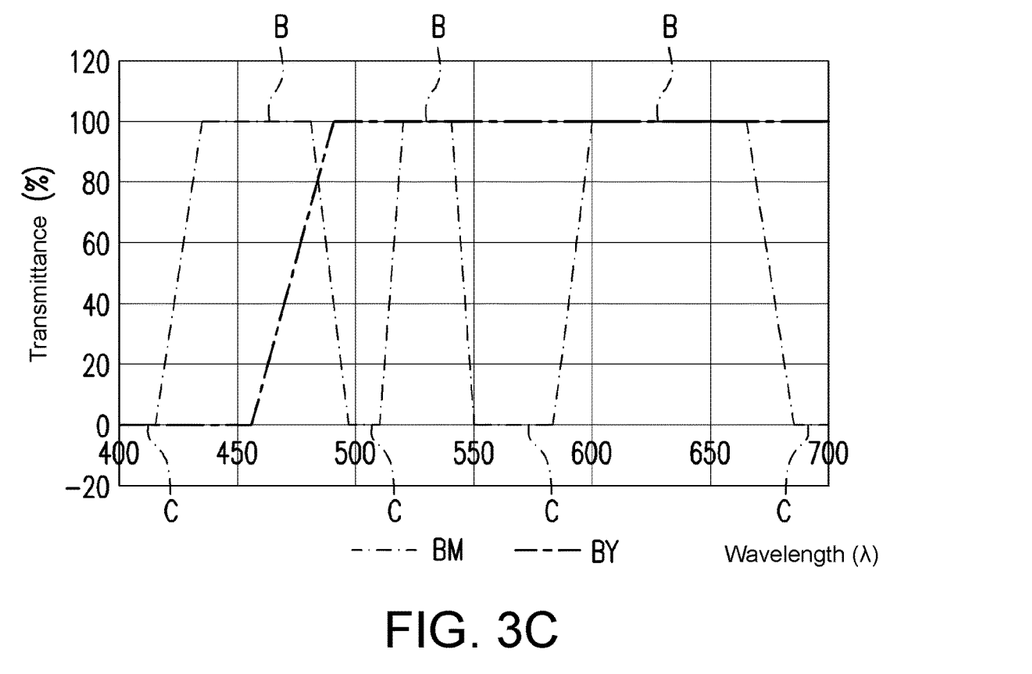
FIG. 3C is a comparison diagram of transmittance spectra of a single-band light filtering region S3 and the multi-band light filtering region M in FIG. 2A.
Figure 3D:
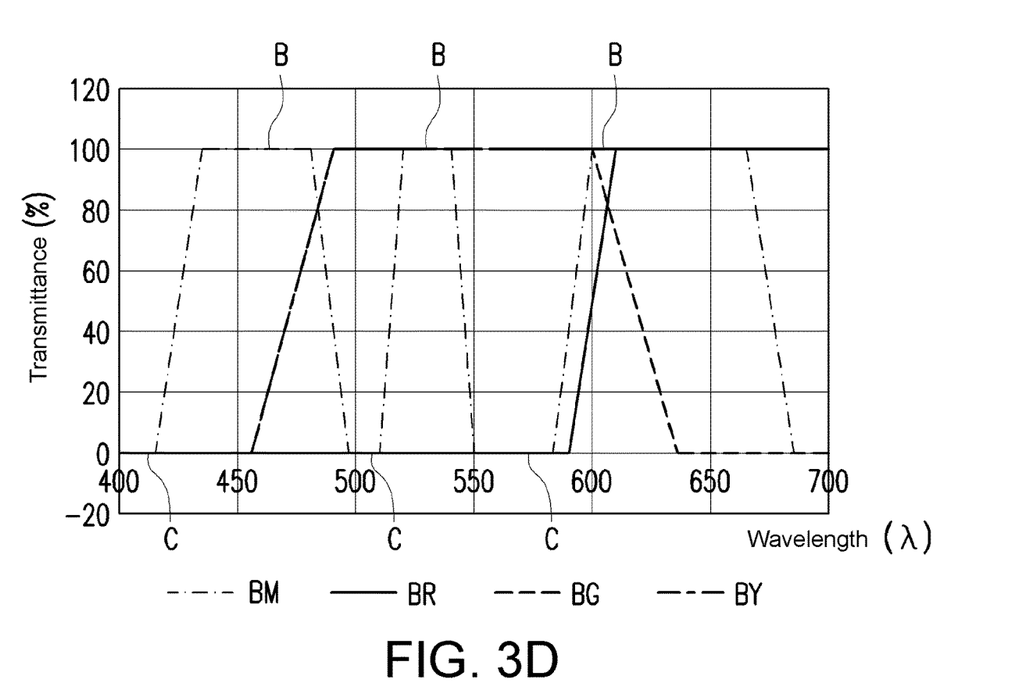
FIG. 3D is a comparison diagram of transmittance spectra of the single-band light filtering regions S1, S2, and S3 and the multi-band light filtering region M in FIG. 2A.

FIG. 3A is a comparison diagram of transmittance spectra of a single-band light filtering region S1 and a multi-band light filtering region M in FIG. 2A. FIG. 3B is a comparison diagram of transmittance spectra of a single-band light filtering region S2 and the multi-band light filtering region M in FIG. 2A. FIG. 3C is a comparison diagram of transmittance spectra of a single-band light filtering region S3 and the multi-band light filtering region M in FIG. 2A. FIG. 3D is a comparison diagram of transmittance spectra of the single-band light filtering regions S1, S2, and S3 and the multi-band light filtering region M in FIG. 2A. Referring to FIGS. 2A to 2E and FIGS. 3A to 3D, the light filtering element 110a includes the single-band light filtering regions S1, S2, and S3, and the multi-band light filtering region M. A visible light transmittance spectrum is defined as the part of an electromagnetic spectrum that may be seen or felt by the human eye, such as an electromagnetic wave with a wavelength ranging from 360 nm to 830 nm. In the visible light transmittance spectrum, the single-band light filtering regions S1, S2, and S3 respectively include band-pass wave bands BR, BG, and BY. For example, the single-band light filtering region S1 has the band-pass wave band BR that allows red light to penetrate but blocks other colors of light; the single-band light filtering region S2 is, for example, the band-pass wave band BG that allows green light to penetrate but blocks other colors of light; the single-band light filtering region S3 is, for example, the band-pass wave band BY that allows red light, yellow light, and green light (red light and green light are mixed to show yellow light) to penetrate but block other colors of light.

The multi-band light filtering region M includes a plurality of first band-pass wave bands B and a plurality of first cut-off wave bands C. As shown in FIGS. 3A to 3D, the first band-pass wave band B is defined as the wave band of the illumination light beam L1 that may penetrate the light filtering element 110a, that is, the wave band where the transmittance is not 0%. The first cut-off wave band C is defined as the wave band where the transmittance of the illumination light beam L1 penetrating the light filtering element 110a is 0%. Each of these first band-pass wave bands B is located between two adjacent first cut-off wave bands C, and at least one of these first band-pass wave bands B at least partially overlaps the band-pass wave bands BR, BG, and BY. These first band-pass wave bands B and these first cut-off wave bands C are combined as multiple band-pass wave bands BM of the multi-band light filtering region M.

Referring to FIG. 2A, in a first color gamut mode P1, the wavelength conversion element 120 and the light filtering element 110a rotate at a first relative rate, and the first relative rate is, for example, 0; that is, the wavelength conversion element 120 and the light filtering element 110a rotate synchronously. The single-band light filtering regions S1, S2, and S3 and the multi-band light filtering region M sequentially cut into the transmission path of the illumination light beam L1. Specifically, when the wavelength conversion region 122 cuts into the transmission path of the blue excitation light beam L0 from the light source 13, the blue excitation light beam L0 excites the red phosphor in the wavelength conversion region 122 to produce the red illumination light beam L1. At this time, the single-band light filtering region S1 cuts into the transmission path of the red illumination light beam L1 to filter the red illumination light beam L1 into a purer red combined beam L1', and the purer red combined beam L1' is then passed to the light valve 14 (shown in FIG. 1). When the wavelength conversion region 124 cuts into the transmission path of the blue excitation light beam L0 from the light source 13, the blue excitation light beam L0 excites the green phosphor in the wavelength conversion region 124 to produce the green phosphor illumination light beam L1. At this time, the single-band light filtering region S2 cuts into the transmission path of the green illumination light beam L1 to filter the green illumination light beam L1 into the purer green combined beam L1', and the purer green combined beam L1' is then passed to the light valve 14. When the wavelength conversion region 126 cuts into the transmission path of the blue excitation light beam L0 from the light source 13, the blue excitation light beam L0 excites the yellow phosphor in the wavelength conversion region 126 to produce the yellow phosphor illumination light beam L1. At this time, the single-band light filtering region S3 cuts into the transmission path of the yellow illumination light beam L1 to filter the yellow illumination light beam L1 into the purer yellow combined beam L1', and the purer yellow combined beam L1' is then passed to the light valve 14.

That is to say, in this embodiment, the wavelength conversion element 120 is, for example, a phosphor wheel, which rotates to allow the wavelength conversion regions 122, 124, and 126 and the non-wavelength conversion region 128 to sequentially cut into the transmission path of the excitation light beam L0. In addition, the light filtering element 110a is, for example, a filtering color wheel, which rotates to allow the single-band light filtering regions S1, S2, and S3 and the multi-band light filtering region M to sequentially cut into the transmission path of the excitation light beam L1.

When the non-wavelength conversion region 128 cuts into the transmission path of the blue excitation light beam L0 from the light source 13, the blue excitation light beam L0 penetrates the non-wavelength conversion region 128 and reaches the multi-band light filtering region M, or the blue excitation light beam L0 is reflected by the non-wavelength conversion region 128 to be reflected by multiple reflectors (not shown in the figure) to the multi-band light filtering region M. One of the first band-pass wave bands B of the multi-band light filtering region M is a band-pass wave band that allows blue light to penetrate, so the blue illumination light beam L1 penetrates the multi-band light filtering region M to be passed to the light valve 14.

Referring to FIG. 1, the light valve 14 is disposed on the transmission path of the combined beam L1' to convert the combined beam L1' into an image beam L2. The projection lens 16 is disposed on the transmission path of the image beam L2, and is used to project the image beam L2 to the outside of the projection device 10, for example, to a projection target outside of the projection device 10. The projection target is, for example, a screen or a wall surface. In this embodiment, the light valve 14 is, for example, a digital micro-mirror device (DMD), a liquid-crystal-on-silicon panel (LCOS panel), a transparent liquid-crystal panel or other spatial light modulators (SLM). The light valve 14 sequentially converts the red, green, yellow, and blue combined beams L1' in the first color gamut mode P1 into the image beams L2, and the projection lens 16 may project a color image on the projection target in a time-multiplexed manner. The projection lens 16 includes, for example, one or a combination of a plurality of optical lenses having refractive power, including, for example, various combinations of non-planar lenses including a biconcave lens, a biconvex lens, a concave-convex lens, a convex-concave lens, a plano-convex lens, and a plano-concave lens. In an embodiment, the projection lens 16 may include a planar optical lens. The disclosure does not limit the type of the projection lens 16.

Referring to FIGS. 2B to 2E, in a second color gamut mode P2, the wavelength conversion element 120 and the light filtering element 110a rotate at a second relative rate, and the multi-band light filtering region M is on the transmission path of the illumination light beam L1. In this embodiment, in the second color gamut mode P2, the wavelength conversion element 120 and the light filtering element 110a rotating at the second relative rate includes the light filtering element 110a being static and the wavelength conversion element 120 rotating relative to the light filtering element 110a, or, in other embodiments, the wavelength conversion element 120 and the light filtering element 110a rotating asynchronously.

Specifically, in this embodiment, the light filtering element 110a remains static, so that the multi-band light filtering region M is maintained on the transmission path of the illumination light beam L1, and the wavelength conversion element 120 rotates continuously, so that the wavelength conversion regions 122, 124, and 126 and the non-wavelength conversion region 128 sequentially cut into the transmission path of the excitation light beam L0 to sequentially form the red, green, yellow, and blue illumination light beams L1 passed to the light filtering element 110a. Referring to any of the multiple band-pass wave bands BM in FIGS. 3A to 3D, one of these first band-pass wave bands B of the multi-band light filtering region M is a band-pass wave that allows red light to penetrate, which may filter the red illumination light beam L1 into the purer red combined beam L1' and pass the purer red combined beam L1' to the light valve 14 (shown in FIG. 1). Another one of the first band-pass wave bands B of the multi-band light filtering region M is a band-pass wave band that allows green light to penetrate, which may filter the green illumination light beam L1 into the purer green combined beam L1' and pass the purer green combined beam L1' to the light valve 14. Two of the first band-pass wave bands B of the multi-band light filtering region M are a band-pass wave band that allows red light to penetrate and a band-pass wave band that allows green light to penetrate, which may filter the yellow illumination light beam L1 into the purer red and green (the addition of which is yellow) combined beam L1' and passes the purer red and green combined beam L1' to the light valve 14. Yet another one of the first band-pass wave bands B of the multi-band light filtering region M is a band-pass wave band that allows blue light to penetrate, which allows the blue illumination light beam L1 to pass through and allows the blue combined beam L1' to be passed to the light valve 14. In this way, in the second color gamut mode P2, as the wavelength conversion element 120 rotates continuously, the wavelength conversion regions 122, 124, and 126 and the non-wavelength conversion region 128 sequentially cut into the transmission path of the excitation light beam L0. The light valve 14 may sequentially receive the red, green, yellow and blue combined beams L1' in the second color gamut mode P2, sequentially convert the combined beams L1' into the image beams L2, and form a color image on the projection target.

In other words, the illumination light beam L1 includes first color light (for example, the above-mentioned red illumination light beam L1) at a first time point and second color light (for example, the above-mentioned blue illumination light beam L1) at a second time point. In the first color gamut mode P1, the first color light is incident on the single-band light filtering region S1, and the second color light is incident on the multi-band light filtering region M. In the second color gamut mode P2, both the first color light and the second color light are incident on the multi-band light filtering region M. In this embodiment, the illumination light beam L1 further includes third color light (such as the above-mentioned green illumination light beam L1) at a third time point and fourth color light (such as the above-mentioned yellow illumination light beam L1) at a fourth time point. In the first color gamut mode P1, the third color light and the fourth color light are respectively incident on the single-band light filtering regions S2 and S3, and in the second color gamut mode P2, both the third color light and the fourth color light are incident on the multi-band light filtering region M.

The types of color light of the disclosure are not limited to the above four; that is, the total number of wavelength conversion regions and non-wavelength conversion regions is not limited to four, and the number of single-band light filtering regions is not limited to three. In other embodiments, the color light may be red light, green light, and blue light (that is, the total number of wavelength conversion regions and non-wavelength conversion regions is three, and the three regions respectively form the red, green and blue illumination light beams L1). Alternatively, in other embodiments, the color light may be two colors such as yellow light and blue light, or other colors or other number of colors, and the disclosure is not limited thereto.

In addition, in this embodiment, the sum of the number of regions (for example, 4 in FIG. 2A) of the single-band light filtering regions S1, S2, and S3 and the multi-band light filtering region M of the light filtering element 110a is equal to the number of regions (for example, 4 in FIG. 2A) of at least two wavelength conversion regions 122, 124, and 126 and the non-wavelength conversion region 128 of the wavelength conversion element 120. In other embodiments, for example, when the color lights are red, green, and blue, the light filtering element 110a may have two single-band light filtering regions S1 and S2 which are red and green and one multi-band light filtering region M, and the wavelength conversion element 120 may have the wavelength conversion regions 122 and 124 and the non-wavelength conversion region 128 which respectively form the red, green, and blue illumination light beams L in sequence. At this time, the sum of the number of regions of the two single-band light filtering regions S1 and S2 and one multi-band light filtering region M of the light filtering element 110a is 3, and the number of regions of the three wavelength conversion regions 122 and 124 and the non-wavelength conversion region 128 of the wavelength conversion element 120 is also 3.

Figure 2F:
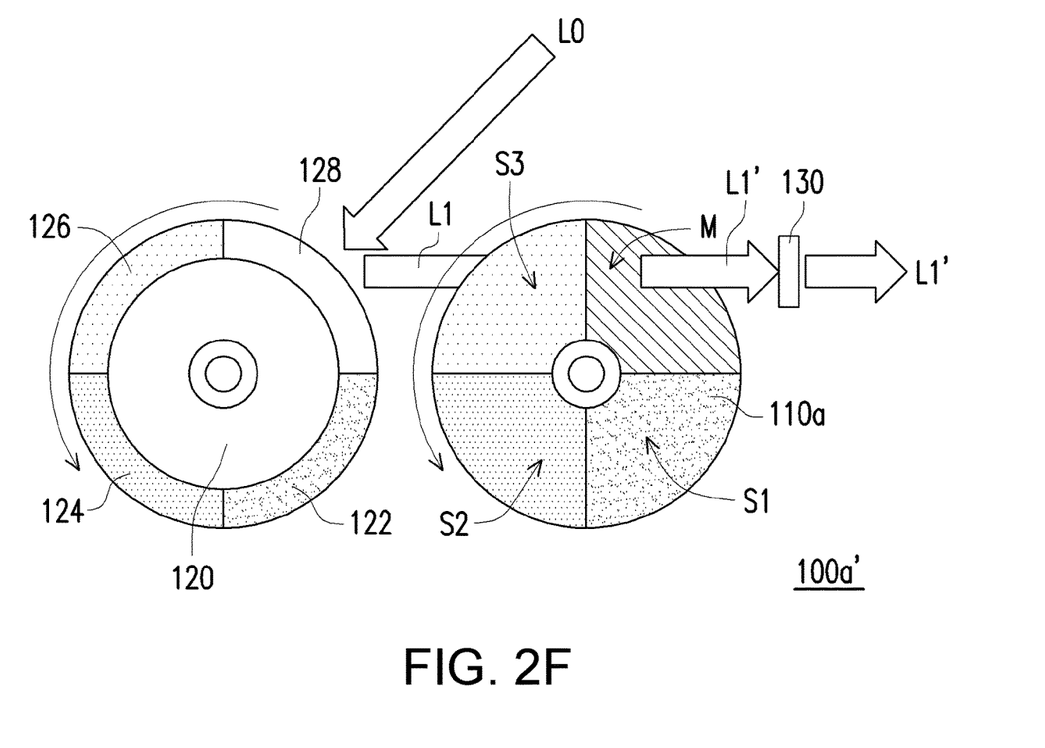
FIG. 2F is a schematic view of a light path of a color gamut conversion module according to another embodiment of the disclosure.

In this embodiment, the multi-band light filtering region M of the light filtering element 110a has an atomized surface, which may be used to suppress a laser speckle phenomenon on the projection target due to high coherence of the blue illumination light beam L1 (that is, the excitation light beam). In another embodiment, as shown in FIG. 2F, a color gamut conversion module 100a' further includes a light diffusing element 130 disposed on the transmission path of the combined beam L1', and the light filtering element 110a is located between the wavelength conversion element 120 and the light diffusing element 130. The light diffusing element 130 may effectively suppress the laser speckle phenomenon like the above-mentioned atomized surface.

In this embodiment, the range of the first band-pass wave bands B of the multi-band light filtering region M is different from that of the band-pass wave bands BR, BG, and BY of the single-band light filtering regions S1, S2, and S3, so the wave bands filtered out are not the same; therefore, when the color gamut conversion module 100a switches between the first color gamut mode P1 and the second color gamut mode P2, the color gamuts displayed in the color image on the projection target are also different, thereby achieving the effect of color gamut switching.

In the color gamut conversion module 100a and the projection device 10 of this embodiment, the light filtering element 110a not only uses the single-band light filtering regions S1, S2, and S3, but also uses the multi-band light filtering region M to filter the illumination light beam L1 from the wavelength conversion element 120 to form another color gamut. Therefore, the color gamut conversion module 100a and the projection device 10 of this embodiment may use simple configuration to achieve color gamut switching without using additional light filtering elements, so the manufacturing cost of the color gamut conversion module and the space occupied by the color gamut conversion module may be effectively reduced. In addition, since the color gamut switching may be achieved without additional light filtering elements being used, the number of wavelength conversion elements and light filtering elements used in the color gamut conversion module 100a and the projection device 10 of this embodiment may be less; therefore, excessive noise is less likely to be produced.

Figure 4:
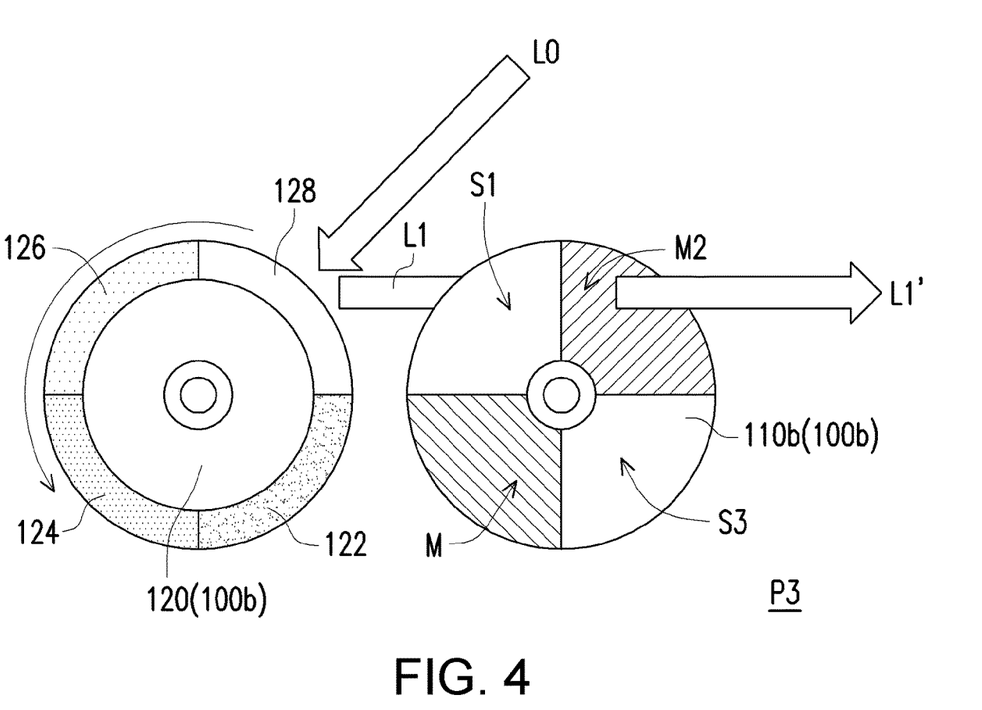
FIG. 4 is a schematic view of a light path of a color gamut conversion module in a projection device according to another embodiment of the disclosure in a third color gamut mode.

FIG. 4 is a schematic view of a light path of a color gamut conversion module in a projection device according to another embodiment of the disclosure in a third color gamut mode. Referring to FIG. 4, the color gamut conversion module 100a in the projection device 10 of FIG. 1 may be replaced by a color gamut conversion module 100b of this embodiment to form another projection device. The color gamut conversion module 100b in this embodiment is similar to the color gamut conversion module 100a in FIGS. 2A to 2E, and the differences between the two are as follows. In the color gamut conversion module 100b of this embodiment, a light filtering element 110b further includes a second multi-band light filtering region M2. In the visible light transmittance spectrum, the second multi-band light filtering region M2 includes a plurality of second band-pass wave bands and a plurality of second cut-off wave bands. Each of these second band-pass wave bands is located between two adjacent second cut-off wave bands, and these second band-pass wave bands are different from the first band-pass wave bands B of the multi-band light filtering region M.

In the first color gamut mode, the wavelength conversion element 120 and the light filtering element 100b rotate at the first relative rate; for example, the wavelength conversion element 120 and the light filtering element 100b rotate synchronously. When the wavelength conversion region 124 (which may contain green phosphor) cuts into the transmission path of the excitation light beam L0, the excitation light beam L0 excites the green phosphor to form the green illumination light beam L1. At this time, the second multi-band light filtering region M2 cuts into the transmission path of the green illumination light beam L1. One of these second band-pass wave bands of the second multi-band light filtering region M2 is a band-pass wave band that allows green light to pass through. That is, the second multi-band light filtering region M2 is used to replace the single-band light filtering region S2 in FIG. 2A.

In the second color gamut mode, the wavelength conversion region 122, 124, and 126 and the non-wavelength conversion region 128 sequentially cut into the transmission path of the excitation light beam L0, and the multi-band light filtering region M is continuously maintained on the transmission path of illumination light beam L1. The above situation is the same as the situation in FIGS. 2B to 2E, which will not be repeated herein.

In a third color gamut mode P3, as shown in FIG. 4, the wavelength conversion element 120 and the light filtering element 110b rotate at a third relative rate, and the second multi-band light filtering region M2 is on the transmission path of the illumination light beam L1. Regarding rotating at the third relative speed, for example, the wavelength conversion element 120 may maintain rotating continuously, while the light filtering element 110b may remain static, so that the second multi-band light filtering region M2 may be maintained on the transmission path of the illumination light beam L1. The second band-pass wave bands of the second multi-band light filtering region M2 may include a red band-pass wave band, a green band-pass wave band, and a blue band-pass wave band. The above situation is similar to that of the multi-band light filtering region M, except that the range of each band-pass wave band of the second multi-band light filtering region M2 is different from the range of each band-pass wave band of the multi-band light filtering region M; therefore, in the first color gamut mode, the second color gamut mode, and the third color gamut mode, three different color gamuts may be generated.

According to another embodiment of the disclosure, in addition to the above three different color gamuts, in the color gamut conversion module 100b of this embodiment, the light filtering element 110b may further include a third multi-band light filtering region and/or a fourth multi-band light filtering region (not shown in the figures). In the visible light transmittance spectrum, the third/fourth multi-band light filtering region includes a plurality of third/fourth band-pass wave bands and a plurality of third/fourth cut-off wave bands. Each of these third/fourth band-pass wave bands is located between two adjacent third/fourth cut-off wave bands, and these third/fourth band-pass wave bands are different from the first band-pass wave bands B of the multi-band light filtering region M and the second band-pass wave bands. In a fourth color gamut mode, the wavelength conversion element 120 and the light filtering element 110b rotate at a fourth relative rate, and the third multi-band light filtering region is on the transmission path of the illumination light beam L1. In a fifth color gamut mode, the wavelength conversion element 120 and the light filtering element 110b rotate at a fifth relative rate, and the fourth multi-band light filtering region is on the transmission path of the illumination light beam L1. Therefore, the color gamut conversion module of this embodiment may generate five different color gamuts in total. However, the number of color gamut modes provided by the disclosure is not limited thereto.

Figure 5:
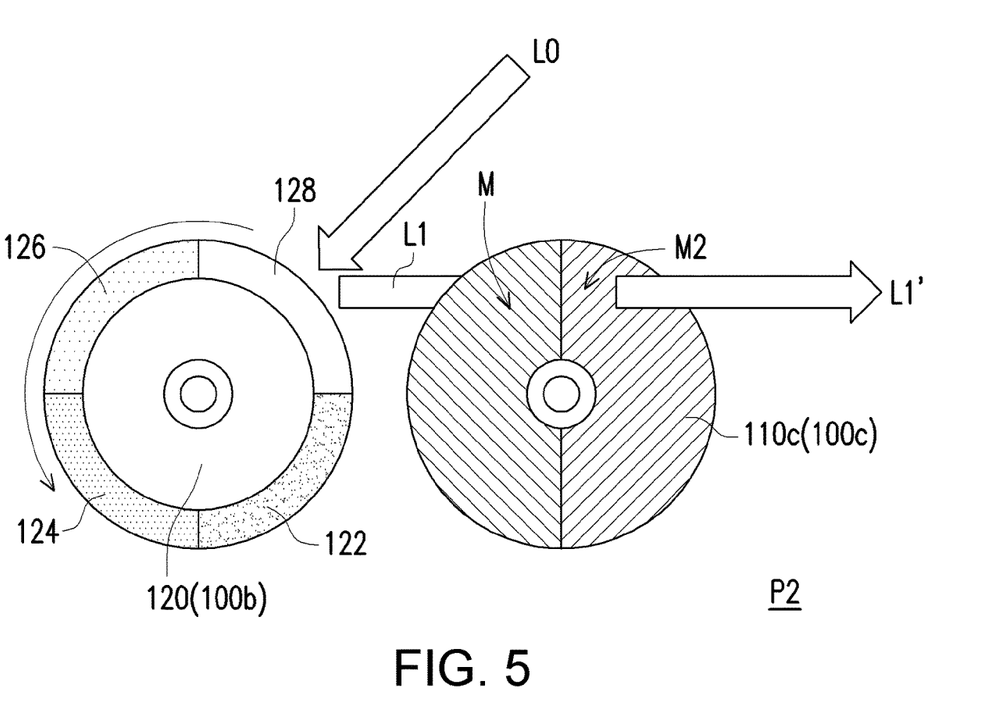
FIG. 5 is a schematic view of a light path of a color gamut conversion module in a projection device according to another embodiment of the disclosure in a second color gamut mode.

FIG. 5 is a schematic view of a light path of a color gamut conversion module in a projection device according to another embodiment of the disclosure in the second color gamut mode. Referring to FIG. 5, a color gamut conversion module 100c in this embodiment is similar to the color gamut conversion module 100b in FIG. 4, and the differences between the two are as follows. In the color gamut conversion module 100c of this embodiment, a light filtering element 110c does not have the single-band light filtering regions S1 and S3 as shown in FIG. 4, but has the multi-band light filtering region M and the second multi-band light filtering region. M2. In the first color gamut mode, the wavelength conversion element 120 and the light filtering element 110c rotate at the first relative rate, and the multi-band light filtering region M is on the transmission path of the illumination light beam L1. In the second color gamut mode P2, as shown in FIG. 5, the wavelength conversion element 120 and the light filtering element 110c rotate at the second relative rate, and the second multi-band light filtering region M2 is on the transmission path of the illumination light beam L1.

In this embodiment, the wavelength conversion element 120 and the light filtering element 110c rotating at the first relative speed and the second relative speed includes the light filtering element 110c being static and the wavelength conversion element 120 rotating relative to the light filtering element 110c. Alternatively, in another embodiment, the wavelength conversion element 120 and the light filtering element 110c may rotate asynchronously.

Specifically, in the first color gamut mode, the wavelength conversion regions 122, 124, and 126 and the non-wavelength conversion region 128 sequentially cut into the transmission path of the excitation light beam L0 to sequentially form the red, green, and yellow and blue illumination light beams L1. At this time, the light filtering element 110c remains static, so that the multi-band light filtering region M is maintained on the transmission path of the illumination light beam L1 to sequentially filter the red, green, yellow and blue combined beams L1'.

In the second color gamut mode, the wavelength conversion regions 122, 124, and 126 and the non-wavelength conversion region 128 sequentially cut into the transmission path of the excitation light beam L0 to form the red, green, yellow, and blue illumination light beam L1. At this time, the light filtering element 110c remains static, so that the second multi-band light filtering region M2 is maintained on the transmission path of the illumination light beam L1 to sequentially filter the red, green, yellow, and blue combined beam L1'.

In other words, the illumination light beam L1 includes the first color light (such as the above-mentioned red illumination light beam L1) at the first time point and the second color light (such as the above-mentioned green illumination light beam L1) at the second time point. In the first color gamut mode, both the first color light and the second color light are incident on the multi-band light filtering region M. In the second color gamut mode, both the first color light and the second color light are incident on the second multi-band light filtering region M2. In this embodiment, the illumination light beam L1 further includes the third color light (such as the above-mentioned yellow illumination light beam L1) at the third time point and the fourth color light (such as the above-mentioned blue illumination light beam L1) at the fourth time point. In the first color gamut mode, both the third color light and the fourth color light are incident on the multi-band light filtering region M. In the second color gamut mode, both the third color light and the fourth color light are incident on the second multi-band light filtering region M2. Like the above-mentioned embodiment in FIGS. 2A to 2E, this embodiment does not limit the number of color light types. In other embodiments, three color lights, two color lights, or other numbers of different color lights may be used.

In this embodiment, the sum of the number of regions (for example, 2 in FIG. 5) of the multi-band light filtering region M and the second multi-band light filtering region M2 of the light filtering element 110c is less than or equal to the number of regions (for example, 4 in FIG. 5) of at least two wavelength conversion regions 122, 124, and 126 and the non-wavelength conversion region 128 of the wavelength conversion element 120. However, in other embodiments, the light filtering element 110c may have other numbers of multi-band light filtering regions (for example, four multi-band light filtering regions), and if the number of regions of the wavelength conversion regions 122, 124, and 126 and the non-wavelength conversion region 128 is 4, the sum of the number of regions of the multi-band light filtering regions is equal to the number of regions of the wavelength conversion regions.

In this embodiment, the multi-band light filtering region M of the light filtering element 110c may have a first atomized surface, and the second multi-band light filtering region M2 may have a second atomized surface, which may suppress the laser speckle phenomenon as described in the above embodiment. However, in other embodiments, the color gamut conversion module 100c may further include the light diffusing element 130 as shown in FIG. 2F, which is disposed on the transmission path of the combined beam L1'. The light filtering element 110c is located between the wavelength conversion element 120 and the light diffusing element 130, and the light diffusing element 130 may be used to suppress the laser speckle phenomenon.

Figure 6:
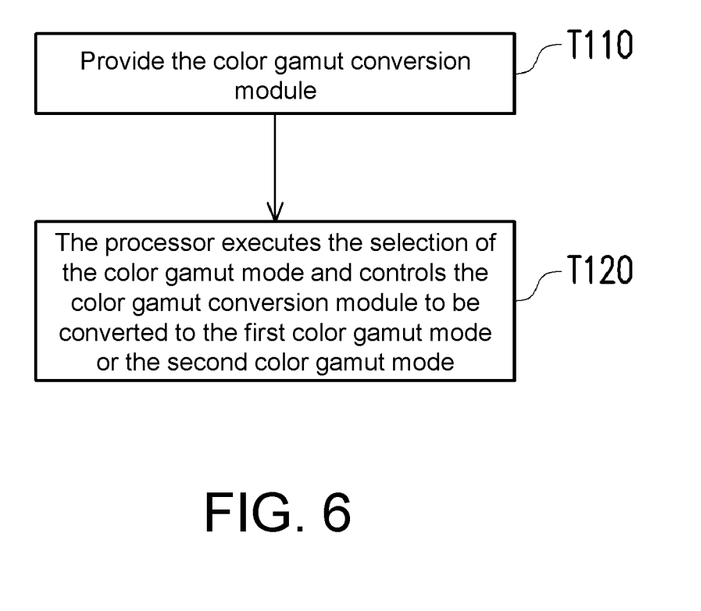
FIG. 6 is a flow chart of a conversion method of a color gamut conversion module according to an embodiment of the disclosure.

FIG. 6 is a flow chart of a conversion method of a color gamut conversion module according to an embodiment of the disclosure. Referring to FIGS. 2A to 2E and FIG. 6, the conversion method of the color gamut conversion module of this embodiment may be implemented by applying the color gamut conversion module of each embodiment as described above. The color gamut conversion module 100a of FIGS. 2A to 2E is taken as an example in the following description. The conversion method of the color gamut conversion module includes the following steps. First, step T110 is performed, in which the color gamut conversion module 100a is provided. The detailed structure and optical path of the color gamut conversion module 100a have been described in detail in the embodiment shown in FIGS. 2A to 2E, and will not be repeated herein. Next, step T120 is performed. When the user requests to change the projection scene, the image color needs to be adjusted. At this time, the processor 18 of the projection device 10 executes the selection of the color gamut mode and controls the color gamut conversion module 100a to be converted to the first color gamut mode P1 or the second color gamut mode P2. The detailed process and method of switching to the first color gamut mode P1 or the second color gamut mode P2 have been described in detail in the embodiment of FIGS. 2A to 2E, and will not be repeated herein.

The conversion method of the color gamut conversion module of this embodiment may also be applied to the embodiment of FIG. 5. When the method is applied to the embodiment of FIG. 4, step T120 is changed to as follows. The processor 18 of the projection device 10 executes the selection of the color gamut mode, and controls the color gamut conversion module 100a to be converted to the first color gamut mode, the second color gamut mode, or the third color gamut mode P3 (as shown in FIG. 4).

The conversion method of the color gamut conversion module of this embodiment may achieve color gamut switching in a simple manner, so the manufacturing cost and volume of the color gamut conversion module may be effectively reduced, and the color gamut conversion module does not generate excessive noise.

In summary, in the color gamut conversion module, the conversion method thereof, and the projection device of the embodiment of the disclosure, the light filtering element uses a multi-band light filtering region to filter the illumination light beam from the wavelength conversion element to form another color gamut. Therefore, the color gamut conversion module, the conversion method thereof, and the projection device of the embodiment of the disclosure may use a simple configuration and method to achieve color gamut switching without additional light filtering elements being used, thereby effectively reducing the manufacturing cost and volume of the color gamut conversion module. In addition, since the color gamut may be switched without using an additional light filtering element, the number of rotating wheels of the color gamut conversion module, the conversion method thereof, and the projection device of the embodiment of the disclosure may be reduced, so that the color gamut conversion module, the conversion method thereof, and the projection device do not produce excessive noise.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A color gamut conversion module, comprising:
a wavelength conversion element; and
a light filtering element, disposed on a transmission path of an illumination light beam from the wavelength conversion element, wherein the light filtering element comprises a plurality of filtering regions, wherein one of the plurality of filtering regions is a multi-band light filtering region, the rest the plurality of filtering regions comprise at least one single-band light filtering region and/or at least one other multi-band light filtering region, and in a visible light transmittance spectrum, the single-band light filtering region comprises a band-pass wave band, and the multi-band light filtering region comprises a plurality of first band-pass wave bands and a plurality of first cut-off wave bands, and each of the first band-pass wave bands is located between two adjacent first cut-off wave bands, wherein at least one of the first band-pass wave bands at least partially overlaps the band-pass wave band, wherein, in a first color gamut mode, the wavelength conversion element and the light filtering element rotate at a first relative rate, in a second color gamut mode, the wavelength conversion element and the light filtering element rotate at a second relative rate, and one of the multi-band light filtering region and the at least one other multi-band light filtering region is on the transmission path of the illumination light beam.

2. The color gamut conversion module according to claim 1, wherein the wavelength conversion element and the light filtering element rotating at the first relative speed and the second relative speed comprises the light filtering element being static and the wavelength conversion element rotating relative to the light filtering element, or the wavelength conversion element rotating synchronously or asynchronously with the light filtering element.

3. The color gamut conversion module according to claim 1, wherein in the first color gamut mode, the single-band light filtering region and the multi-band light filtering region sequentially cut into the transmission path of the illumination light beam, and in the second color gamut mode, the multi-band light filtering region is on the transmission path of the illumination light beam.

4. The color gamut conversion module according to claim 1, wherein the at least one other multi-band light filtering region comprises a second multi-band light filtering region, in the visible light transmittance spectrum, the second multi-band light filtering region comprises a plurality of second band-pass wave bands and a plurality of second cut-off wave bands, each of the second band-pass wave bands is located between two adjacent second cut-off wave bands, and the second band-pass wave bands are different from the first band-pass wave bands.

5. The color gamut conversion module according to claim 4, wherein in the first color gamut mode, the at least one single-band light filtering region, the multi-band light filtering region and the second multi-band light filtering region sequentially cut into the transmission path of the illumination light beam, in the second color gamut mode, the multi-band light filtering region is on the transmission path of the illumination light beam, and in a third color gamut mode, the wavelength conversion element and the light filtering element rotate at a third relative rate, and the second multi-band light filtering region is on the transmission path of the illumination light beam.

6. The color gamut conversion module according to claim 4, wherein in the first color gamut mode, the multi-band light filtering region is on the transmission path of the illumination light beam, and in the second color gamut mode, the second multi-band light filtering region is on the transmission path of the illumination light beam.

7. The color gamut conversion module according to claim 1, wherein the multi-band light filtering region of the light filtering element has an atomized surface.

8. The color gamut conversion module according to claim 1, further comprising:

a light diffusing element, disposed on a transmission path of a combined beam from the light filtering element, wherein the light filtering element is located between the wavelength conversion element and the light diffusing element.

9. The color gamut conversion module according to claim 1, wherein the wavelength conversion element comprises at least two wavelength conversion regions, a sum of a number of regions of the plurality of filtering regions of the light filtering element is less than or equal to a number of regions of the at least two wavelength conversion regions and a non-wavelength conversion region of the wavelength conversion element.

10. A conversion method of a color gamut conversion module, comprising:

providing a color gamut conversion module, wherein the color gamut conversion module comprises a wavelength conversion element and a light filtering element, and the light filtering element comprises a plurality of filtering regions, wherein one of the plurality of filtering regions is a multi-band light filtering region, the rest of the plurality of filtering regions comprise at least one single-band light filtering region and/or at least one other multi-band light filtering region, and in a visible light transmittance spectrum, the single-band light filtering region comprises a band-pass wave band, and the multi-band light filtering region comprises a plurality of first band-pass wave bands and a plurality of first cut-off wave bands, and each of the first band-pass wave bands is located between two adjacent first cut-off wave bands, wherein at least one of the first band-pass wave bands at least partially overlaps the band-pass wave band; and selecting to convert to a first color gamut mode or a second color gamut mode by a processor, wherein in the first color gamut mode, the wavelength conversion element and the light filtering element rotate at a first relative rate, and in the second color gamut mode, the wavelength conversion element and the light filtering element rotate at a second relative rate, and one of the multi-band light filtering region and the at least one other multi-band light filtering region is on the transmission path of the illumination light beam.

11. The conversion method of the color gamut conversion module according to claim 10, wherein the wavelength conversion element and the light filtering element rotating at the first relative speed and the second relative speed comprises the light filtering element being static and the wavelength conversion element rotating relative to the light filtering element, or the wavelength conversion element rotating synchronously or asynchronously with the light filtering element.

12. The conversion method of the color gamut conversion module according to claim 10, wherein in the first color gamut mode, the single-band light filtering region and the multi-band light filtering region sequentially cut into a transmission path of an illumination light beam from the wavelength conversion element, and in the second color gamut mode, the multi-band light filtering region is on the transmission path of the illumination light beam.

13. The conversion method of the color gamut conversion module according to claim 10, wherein the at least one other multi-band light filtering region comprises a second multi-band light filtering region, in the visible light transmittance spectrum, the second multi-band light filtering region comprises a plurality of second band-pass wave bands and a plurality of second cut-off wave bands, each of the second band-pass wave bands is located between two adjacent second cut-off wave bands, and the second band-pass wave bands are different from the first band-pass wave bands.

14. The conversion method of the color gamut conversion module according to claim 13, wherein in the first color gamut mode, the at least one single-band light filtering region, the multi-band light filtering region and the second multi-band light filtering region sequentially cut into a transmission path of an illumination light beam from the wavelength conversion element, in the second color gamut mode, the multi-band light filtering region is on the transmission path of the illumination light beam, and in the third color gamut mode, the wavelength conversion element and the light filtering element rotate at a third relative rate, and the second multi-band light filtering region is on the transmission path of the illumination light beam.

15. The conversion method of the color gamut conversion module according to claim 13, wherein in the first color gamut mode, the multi-band light filtering region is on a transmission path of an illumination light beam from the wavelength conversion element, and in the second color gamut mode, the second multi-band light filtering region is on the transmission path of the illumination light beam.

16. A projection device, comprising:
an illumination module, comprising a light source and a color gamut conversion module, wherein the light source is used to provide an excitation light beam, the color gamut conversion module is disposed on a transmission path of the excitation light beam, and the color gamut conversion module comprises:
a wavelength conversion element; and
a light filtering element, disposed on a transmission path of an illumination light beam from the wavelength conversion element, wherein the light filtering element comprises a plurality of filtering regions, wherein one of the plurality of filtering regions is a multi-band light filtering region, the rest of the plurality of filtering regions comprise at least one single-band light filtering region and/or at least one other multi-band light filtering region, and in a visible light transmittance spectrum, the single-band light filtering region comprises a band-pass wave band, and the multi-band light filtering region comprises a plurality of first band-pass wave bands and a plurality of first cut-off wave bands, and each of the first band-pass wave bands is located between two adjacent first cut-off wave bands, wherein at least one of the first band-pass wave bands at least partially overlaps the band-pass wave band, wherein
in a first color gamut mode, the wavelength conversion element and the light filtering element rotate at a first relative rate,
in a second color gamut mode, the wavelength conversion element and the light filtering element rotate at a second relative rate, and one of the multi-band light filtering region and the at least one other multi-band light filtering region is on the transmission path of the illumination light beam;
a light valve, disposed on a transmission path of a combined beam from the light filtering element, configured to convert the combined beam into an image beam; and
a projection lens, disposed on a transmission path of the image beam, configured to project the image beam to an outside of the projection device.

* * * * *